United States Patent [19]

Curtis

[11] Patent Number: 5,247,464
[45] Date of Patent: Sep. 21, 1993

[54] NODE LOCATION BY DIFFERENTIAL TIME MEASUREMENTS

[75] Inventor: Robert A. Curtis, Hudson, Mass.

[73] Assignee: Digital Equipment Corporation, Maynard, Mass.

[21] Appl. No.: 357,078

[22] Filed: May 25, 1989

[51] Int. Cl.$^5$ .............................................. G01B 7/02
[52] U.S. Cl. .................................. 364/562; 364/569; 340/825.49; 370/17; 379/24; 379/25
[58] Field of Search ............... 364/561, 562, 565, 569, 364/200, 900; 370/17; 379/24, 25, 22; 340/825.49

[56] References Cited

U.S. PATENT DOCUMENTS

| | | |
|---|---|---|
| 4,890,278 | 12/1989 | Felker et al. ............................ 370/17 |
| 4,901,004 | 2/1990 | King ...................................... 379/25 |
| 4,916,444 | 4/1990 | King ...................................... 379/25 |
| 4,939,718 | 7/1990 | Servel et al. ......................... 370/85.15 |

Primary Examiner—David L. Clark
Assistant Examiner—Matthew C. Fagan
Attorney, Agent, or Firm—Fish & Richardson

[57] ABSTRACT

A system for determining the physical location of nodes on a network. The system includes two stations each of which has a clock. Each station uses its clock to determine the arrival times at the station of a packet transmitted over the network from a first node to a second node and of a reply packet sent by the second node to the first node. The arrival times of the packets and the corresponding reply packets are then used to calculate the distance along the network which separates the first and second node. Measurement of packet arrival times for all of the nodes yields the position of all of the nodes on the network.

14 Claims, 4 Drawing Sheets

NODE LOCATION BY DIFFERENTIAL TIME MEASUREMENTS

BACKGROUND OF THE INVENTION

This invention relates generally to the field of computer networks and, more particularly, to locating nodes on computer networks.

Basically, a computer network is an interconnection of nodes, which is a general term referring to a wide variety of electronic devices including, for example, host computers, terminals, printers, servers and storage devices. On some networks, such as an Ethernet, a cable physically interconnects all of the nodes on the network and provides the medium through which the nodes communicate with each other. Thus, if the network is installed throughout a building complex, the cable is routed through each location within the building complex at which current access is desired or future access is anticipated. The network can become very long and include many nodes. In addition, the network will typically change over time as nodes are added, moved and removed and as the cable is extended into other physical locations based upon changing user requirements.

The large size and changing character of networks creates special problems for system managers and maintenance and repair personnel. A typical responsibility of the system manager is to monitor communication traffic over the network to identify problems, to identify portions of the network where user demand requires expansion of system services and to generally gather information which would be useful for improving service. Maintenance and repair personnel, on the other hand, usually have the responsibility for troubleshooting and correcting network malfunctions. For both the system manager and maintenance and repair personnel it is particularly desirable that they be able to easily identify high traffic or defective nodes and their physical location so that services can be most effectively improved and problems can be repaired. Since both the location and identity of nodes change over time, ascertaining the physical location of a node at any given time can be especially difficult.

SUMMARY OF THE INVENTION

In general, in one aspect, the invention is an apparatus for determining the location of nodes on a network segment, said segment having a plurality of nodes coupled thereto, said plurality of nodes having at least a first node and a second node. The apparatus includes a first station for receiving packets at a first location on said segment, the first station including a first means for recording a first arrival time that is the time at which a first packet arrives at the first station and a second arrival time that is the time at which a second packet at the first station, the first packet being sent by the first node, and the second packet being sent by the second node; a second station for receiving packets at a second location on said segment, the second station including a second means for recording a third arrival time that is the time at which the first packet arrives at the second station and a fourth arrival time that is the time at which the second packet arrives at the second station; and a computational element for computing a distance between the first node and second node based upon the first, second, third and fourth arrival times.

Preferred embodiments include the following features. The computational element computes the distance based upon the following equation:

$$D = A * [(T_{21} - T_{11}) - (T_{22} - T_{12})]$$

where A is a constant which is equal to about one half of the speed at which a packet propagates over the network segment and where D is the distance, $T_{21}$ is the second arrival time, $T_{11}$ is the first arrival time, $T_{22}$ is the fourth arrival time, and $T_{12}$ is the third arrival time. In addition, the first recording means includes a first detector for detecting the arrivals at the first station of the first and second packets; a first clock for determining the first and second arrival times based upon the detected arrival at the first station of the first and second packets, respectively; and a first memory for storing the first and second arrival times. And, the second recording means includes a second detector for detecting the arrivals at the second station of the first and second packets; a second clock for determining the third and fourth arrival times based upon the detected arrival at the second station of the first and second packets, respectively; and a second memory for storing the third and fourth arrival times Also in preferred embodiments, the first and second detectors detects the arrivals of the first and second packets by detecting preambles of the corresponding packets. Further, the plurality of nodes has a corresponding address and the first station includes first recognizer logic for determining the address of the nodes which sent the first and second packets, the identified addresses being stored in the first memory in association with the corresponding first and second arrival times And, the second station includes a second recognizer logic for determining the address of the nodes which sent the first and second packets, the identified addresses being stored in the second memory in association with the corresponding third and fourth arrival times. Also, the first location and the second location are selected so that the locations at which the first node and the second node are coupled to the network segment are situated between the first and second locations.

The apparatus significantly improves the speed and accuracy of the mapping of network nodes in comparison to previously existing systems. In addition, one advantage of the apparatus is that the two clocks which are used to make the arrival time measurements need not be synchronized The two clocks only need to be accurate so that elapsed time measurements are comparable. In addition, the apparatus involves minimal interference with the normal packet traffic over the network.

DESCRIPTION OF THE PREFERRED EMBODIMENT

STRUCTURE AND OPERATION

Figure 1:
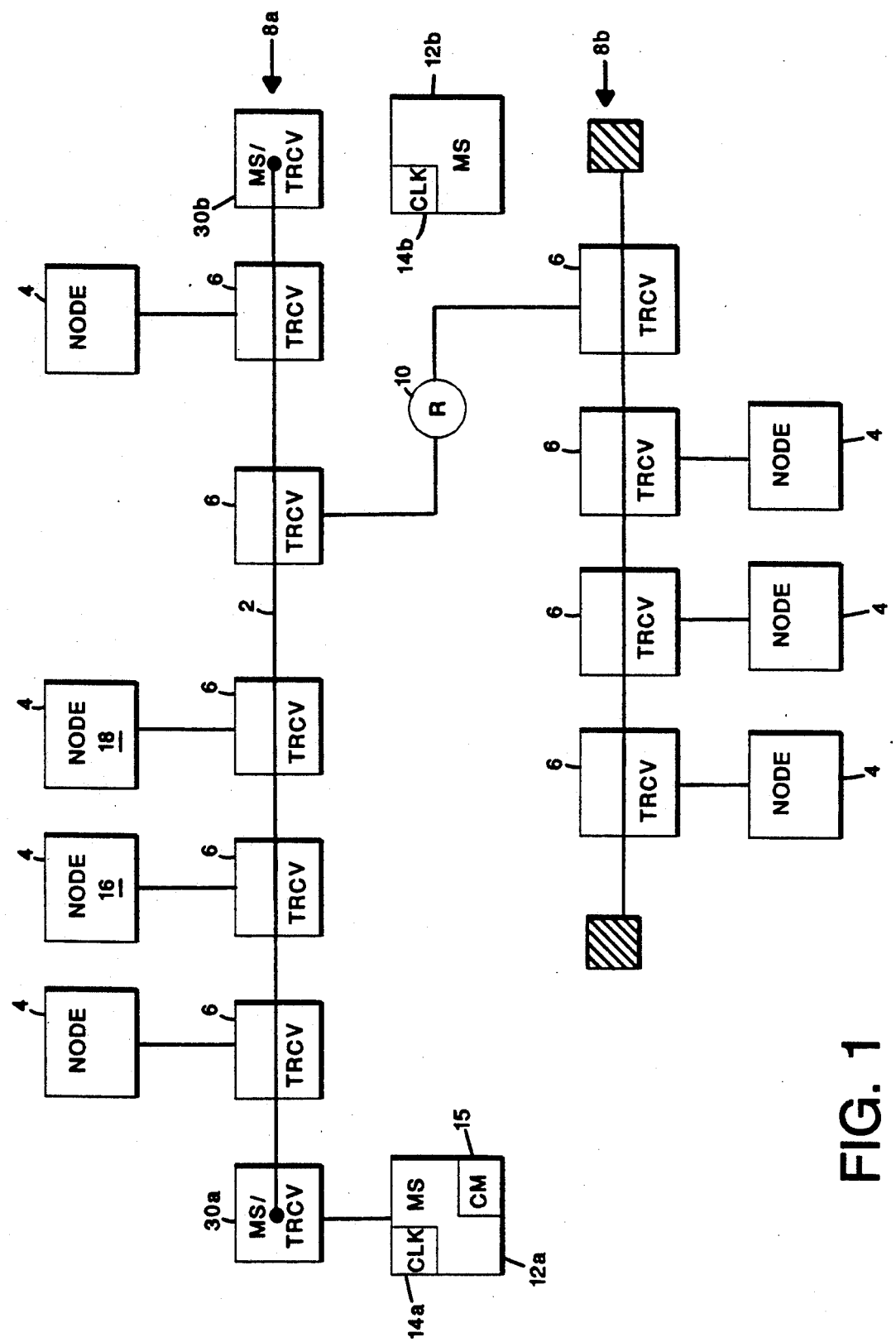
FIG. 1 is a block diagram of a distributed system which embodies the invention.

FIG. 1 is a representative illustration of a distributed system which will be used to describe the invention. The distributed system includes a plurality of nodes 4 that communicate over a network. In one particular embodiment, the network is an Ethernet but this choice is not meant to limit the applicability of the invention described herein. In general, the network comprises a cable 2 which interconnects the plurality of nodes 4, each of which may be any of a variety of devices such as terminals, printers, servers and frontend processors, to name a few. Generally, the nodes 4 are capable of both transmitting and receiving information, usually in the form of packets, over the cable 2. When a node 4 is sending information, it is referred to as a source node; whereas, when it is receiving information, it is referred to as a destination node. Each of the nodes 4 is electrically connected to the cable 2 through a transceiver (TRCX) 6 which places packets onto the cable 2 for the node 4 and which senses when the cable 2 is busy (i.e. when other packets are being transmitted over the cable 2). In addition to placing packets onto the cable 2, the transceiver 6 also receives packets addressed to its node 4.

As illustrated, the network may be subdivided into segments 8a and 8b which are interconnected by a repeater 10. The repeater 10 is a forwarding device which facilitates communication between segments Thus, for example, if a packet is being sent to a node on another segment of the network from the node which is sending the packet, the repeater 10 receives the packet and retransmits it to the next segment to which the repeater 10 is connected.

In accordance with the invention, two maintenance stations 12 are connected to the segment 8a, namely, a first maintenance station (MS) 12a including a first clock (CLK) 14a is connected to one end of the segment 8a and a second maintenance station (MS) 12b including a second clock (CLK) 14b is connected to the other end of the segment 8a. As the nodes 4 on the segment send packets to each other, both maintenance stations 12a and 12b monitor the packet traffic by recording the arrival times of the packets at the respective station and the identity of the nodes sending the packets. Thus, for example, when a first node 16 sends a packet to a second node 18, the first maintenance station 12a, using its first clock 14a, determines the time $T_{11}$ at which the packet reaches its location on the segment 8a. Similarly, the second maintenance station 12b, using its second clock 14b, also determines the time $T_{12}$ at which the packet reaches its location on the segment 8a. (Note that for a time T specified herein "n" designates the node sending the packet and "s" designates the maintenance station.) Then, when the second node 18 responds to the packet from the first node 16, both maintenance stations again monitor the times at which the reply packet arrives at their corresponding locations. That is, the first maintenance station determines the time $T_{21}$ at which it receives the second packet and the second maintenance station determines the $T_{22}$ at which it receives the second packet.

Figure 2:
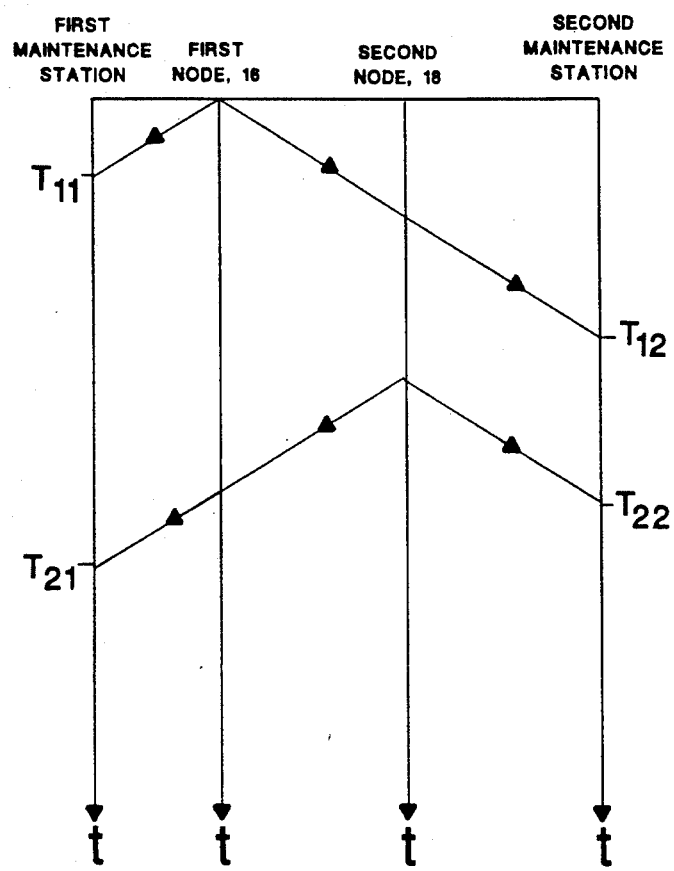
FIG. 2 is a timing chart showing the arrival times of packets transmitted over the system shown in FIG. 1.

A timing chart illustrating the relative arrival times of packets at the different nodes is depicted in FIG. 2. The horizontal axis shows the relative spatial separation of the nodes and the vertical axes represent time lines for each of the relevant nodes as indicated.

Using the following equation, a computational module (CM) 15 uses the four arrival times to determine the separation D between the first node and the second node, as measured along the cable:

$$D=[(T_{21}-T_{11})-(T_{22}-T_{12})]*c/2 \qquad \text{Eq. 1}$$

where c = the speed at which the packet travels on the segment.

The speed at which the packet travels on the segment can be easily determined by knowing the length of the segment and the time it takes the packet to traverse the segment. It will become apparent from the discussion below, however, that knowing "c" is not imperative. Since it is simply a scaling factor, the relative separations between the different nodes can be determined without it. Moreover, the separation distances can then easily be calculated b knowing either the overall length of the cable 2 or any one of the actual separation distances.

To verify that Eq. 1 does, indeed, correctly specify the separation distance between the first node 16 and the second node 18, consider the following derivation. A general expression for the time that it takes a packet to travel from a node to a maintenance station is $T_{ns}-T_{nst}$, where $T_{ns}$ is defined as above and $T_{nst}$ is the time at which the node "n" transmits the packet as measured on the clock of maintenance station "s".

The distance separating the first node 16 from the second node 18, as measured along the cable 2, can be readily specified in the following two ways:

$$D=D_{21}-D_{11} \qquad \text{Eq. 2}$$

$$D=D_{12}-D_{22} \qquad \text{Eq. 3}$$

Where:

$D_{11}$ is the distance from the first node 16 to the first maintenance station 12a;

$D_{12}$ is the distance from the first node 16 to the second maintenance station 12b;

$D_{21}$ is the distance from the second node 18 to the first maintenance station 12a; and $D_{22}$ is the distance from the second node 18 to the second maintenance station 12b.

Using the transmit and arrival times for each packet at each station, Eq. 2 and Eq. 3 can be stated as follows:

$$D=D_{21}-D_{11}=[(T_{21}-T_{21t})-(T_{11}-T_{11t})]*c \qquad \text{Eq. 4}$$

$$D=D_{12}-D_{22}=[(T_{12}-T_{12t})-(T_{22}-T_{22t})]*c \qquad \text{Eq. 5}$$

Rearranging Eq. 4 and Eq. 5:

$$D=[(T_{21}-T_{11})-(T_{21t}-T_{11t})]*c \qquad \text{Eq. 6}$$

$$D=[(T_{12}-T_{22})-(T_{12t}-T_{22t})]*c \qquad \text{Eq. 7}$$

If the two clocks 14a and 14b are accurate, then the difference between the start times for the packets as seen by each maintenance station should be equal. That is, $T_{21t}-T_{11t}=T_{22t}-T_{12t}$. Therefore, when Eq. 6 and Eq. 7 are added, the expressions for the differences in start times sum to zero and the result is Eq. 1. In other words, to determine the distance between nodes, the maintenance stations 12a and 12b need not know the start times for the packet transmissions and the two clocks 14a and 14b need not be synchronized with each other.

By performing the same calculation for all nodes on the network, including the two maintenance stations, the computational module 15 can determine the precise physical location of every node. Thus, for example, if the two nodes sending packets to each other are the first maintenance station 12a and the first node 16, then the computational module 15 can determine the distance of the first node 16 from the first maintenance station 12a from the arrival times of the packets. It should also be apparent that the transit speed of the packets "c" need not be independently measured known if it is possible to determine the separation distance "D" of any two nodes by alternative means, such as direct measurement of the distance. If the separation distance "D" and the arrival times are known, packet transit speed "c" can be calculated using Eq. 1.

In addition, the computational module 15 may be located in either maintenance station 12 or in a third node which is responsible for providing network management functions. Of course, if a third node possesses the computational module 15, then it would also have to periodically collect the arrival time measurements from both the first and second maintenance stations before it could compute the node locations.

Figure 3:
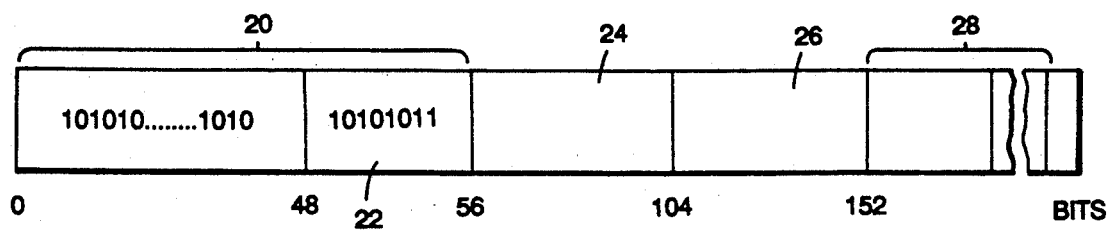
FIG. 3 illustrates the structure of a packet which is the form in which information is sent over the network depicted in FIG. 1.

An illustrative embodiment of the invention will now be described with the help of FIGS. 3, 4 and 5. In this embodiment, information is sent over the network in the form of packets which have the structure illustrated in FIG. 3. Each packet comprises a 56 bit preamble 20, which includes an 8-bit start of frame delimiter 22; a 48 bit destination address field 24, which contains the address of the node to which the packet is being sent; a 48 bit source address field 26, which contains the address of the node that sent the packet; and a data field 28 that contains the information being sent. The preamble consists of a 56 bit sequence of alternating ones and zeros followed by the frame delimiter, which has the pattern, 10101011.

Figure 4:
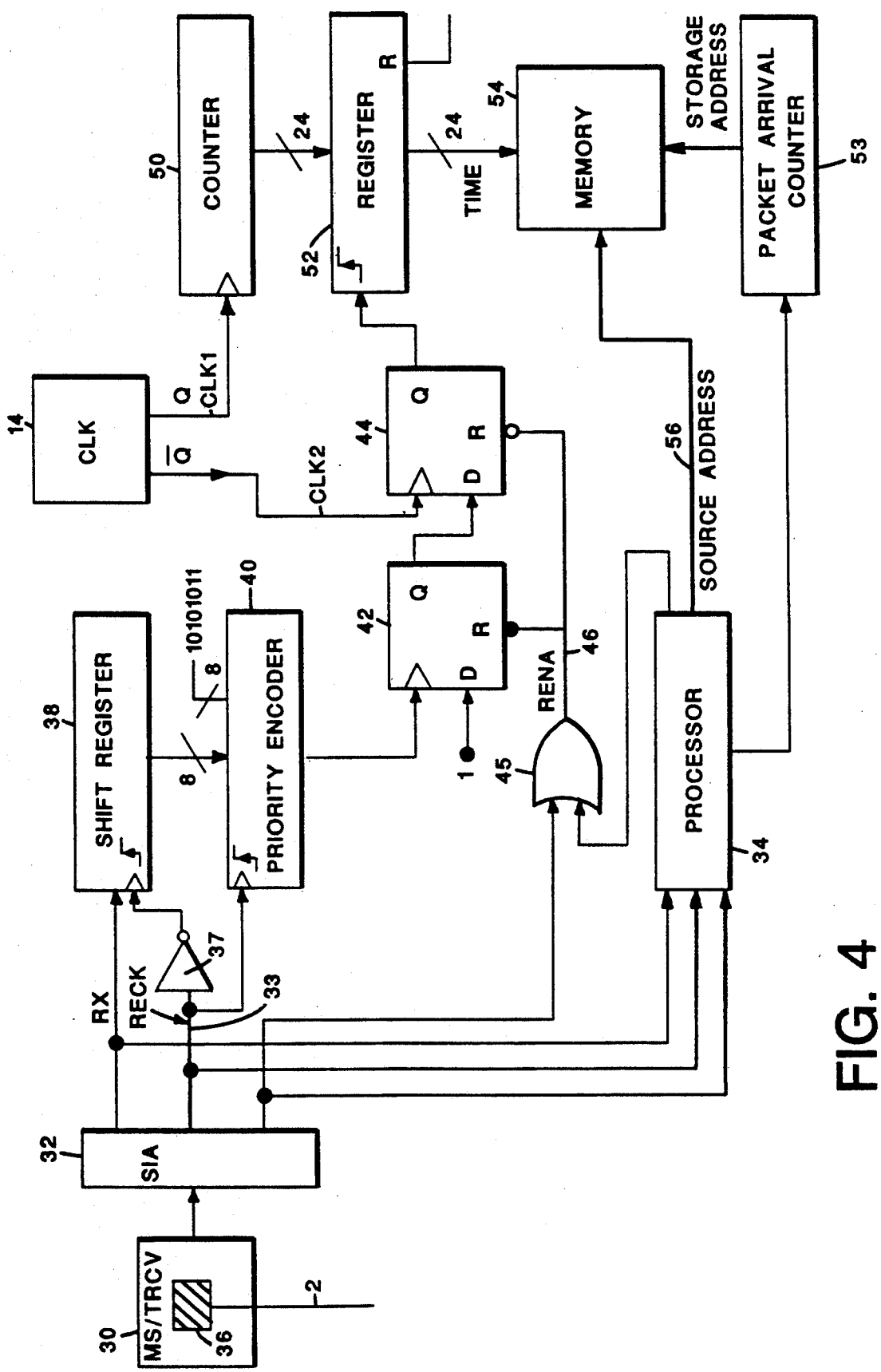
FIG. 4 is a block diagram of the maintenance stations which are depicted in FIG. 1.
Figure 5:
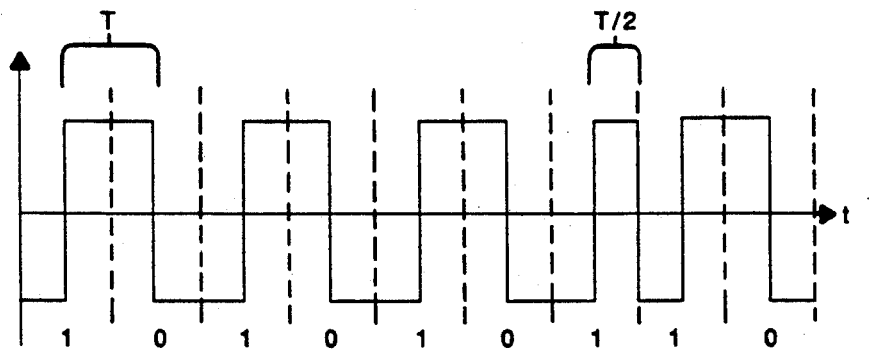
FIG. 5 depicts a Manchester coded signal.

As illustrated in FIG. 4, the maintenance station 12 that monitors these packets includes a station transceiver (TRCX) 30, which connects to the cable 2 and detects the presence of packets arriving at the location of the station 12. A serial interface adapter (SIA) 32 receives the packets from the station transceiver 30. A processor 34 processes the information contained in the packets as received by SIA 32. If the station 12 is located at the end of the segment 8a, the station transceiver 30 may also include a termination circuit 36 which properly terminates the cable 2 and prevents signals from being reflected back down the line. (Note that station transceivers (TRCX) 30a and 30b corresponding to the first and second station 12a and 12b are also shown in FIG. 1 at the end of the segment 8a.)

The station 12 also includes elements that determine and store the arrival times of packets. The elements comprise an eight-bit shift register 38, which receives output from the SIA 32, and a priority encoder 40, which monitors the data in the shift register 38. The priority encoder 40, which normally holds its output at a low voltage level (or deasserted state), compares the contents of the shift register 38 to a preselected bit pattern, which is identical to the frame delimiter, and upon detecting the preselected pattern, generates a high voltage (or high state) on its output.

The output of the priority encoder 40 drives the clock input of an edge-triggered type-D flip-flop 42. From each packet being received, the SIA 32 generates a receive clock (RECK) signal 33 which is used to clock both the shift register 38 and the priority encoder 40. To assure that the shift register 38 has had time to settle down before its contents are read by the priority encoder 40, an inverter 37 inverts RECK signal 33 which is sent to the shift register 38. Thus, the shift register 38 and the priority encoder 40 respond to different edges of the RECK signal 33.

The D-input of the flip-flop 42 is held at a high state. Thus, when the output of the priority encoder 40 transitions to a high voltage, this clocks the high state appearing at the D-input onto the Q-output of the flip-flop 42. The output of the flip-flop 42 drives the D-input of another edge-triggered type-D flip-flop 44. As will be described in more detail shortly, the clock 14 provides the signal which clocks the flip-flop 44. Both the flip-flops 42 and 44 are reset by an asserted reset enable (RENA) signal 46 from an OR gate 45. The RENA reset enable signal 46 is generated by either the SIA 32 or the processor 34 and is asserted near the end of a received packet, thereby initializing the circuit for the next packet.

The clock 14 generates two clock signals CLK1 and CLK2, which are the complement of each other. Clock signal, CLK1, controls a counter 50, which increments each time it receives a positive-going edge of its CLK1 clock signal. Clock signal, CLK2, controls the clock input of the flip-flop 44. The output of the flip-flop 44, in turn, controls a time register 52, which, in response to a positive-going transition of the output of flip-flop 44, receives and holds the contents of the counter 50, which represents the arrival time of the corresponding packet. A memory 54 receives the counter reading from the register 52 (i.e., the packet arrival time) along with a source address 56 which the processor 34 extracted from the packet.

A packet arrival counter 53 consecutively assigns a number to each packet as it arrives. This number is used to designate addresses in memory 54 at which the station stores the arrival time and the corresponding source address for the packet. Thus, after a period of operation, the memory 54 contains a history of packet arrival times and the corresponding source addresses. Of course, once the computational module 15 has used an arrival time in a computation, it is not necessary to retain that arrival time information. Therefore, the history of packet arrival times is limited to a predetermined number of packets after which the station starts the count over from the beginning. The new arrival time and source addresses in the new count cycle replace the old data from the previous count cycle. Since only one node can use the network at any given time, the resulting packet arrival time histories stored in the first and second station 12a and 12b are easily correlated to identify the arrival times corresponding to the same transmitted packet. The computational module 15 identifies the corresponding arrival times and uses them to calculate the node positions on the network as described above.

To facilitate the coordination of the arrival time histories, each maintenance station can periodically send a probe packet containing a sequence number to the other station. Both maintenance stations determine and store th arrival time of each probe packet along with the corresponding sequence number. For the maintenance station transmitting the probe packet, the arrival time is simply the time at which it transmitted the packet. Thus, each probe packet generates a convenient index in the arrival time histories stored at each maintenance station by which the histories may be easily aligned for the node location computations.

Figure 6:
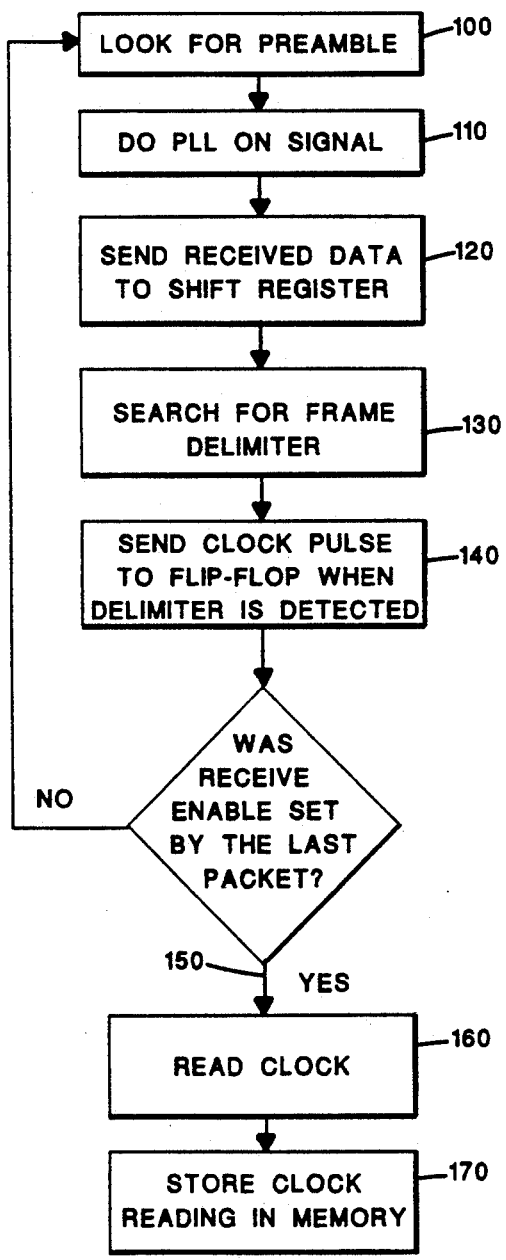
FIG. 6 is a flow chart describing the operation of the maintenance station depicted in FIG. 4

The station 12 operates as shown in FIG. 6. Upon receiving a packet, the SIA 32 looks for the preamble (step 100) so that it may acquire phase lock on the arriving signal (step 110). After locating the preamble and acquiring phase lock, the SIA 32 sends two signals to the shift register 38, namely, the RECK receive clock signal, which is synchronized with the incoming signal, and a receive (RX) signal, which is in the form of a stream of bits corresponding to the arriving packet (step 120). After being inverted, the RECK receive clock signal clocks the RX receive signal into the shift register 38 one bit at time. While the packet bits are passing through the shift register 38, the priority encoder 40 compares the contents of the shift register 38 to the preselected bit pattern, which in this embodiment is the start frame delimiter (step 130). When the priority encoder 40 detects the start of frame delimiter, it clocks flip-flop 42 (step 140). If flip-flop 42 is in its reset condition, which is the case if the previous packet had been completely received, then it drives the D-input of flip-flop 44 to a high voltage (step 150). Otherwise, the circuit branches back to step 100 and begins searching for a valid preamble again (step 155).

When signal at the D-input of flip-flop 44 goes to a high voltage, this sets up flip-flop 44 so that it will respond to the next positive-going clock pulse by switching its output to a high state thereby triggering the register 52. The register 52 then stores the contents of the counter 50 (step 160) and transfers it for storage into the memory 54 as the arrival time of the packet (170).

The accuracy of the above-described technique depends upon maintaining accurate clocks in the two maintenance stations 12a and 12b. It is desirable that the accuracy of the two clocks 14a and 14b be greater than 1 part in $5*10^{-6}$. In addition, since there is no guarantee that a receiving node will transmit right after receiving a packet, accuracy can be improved by causing one of the maintenance stations 12a or 12b to transmit a short packet for measurement purposes within the time gap that normally separates one packet from a previous packet.

Although the embodiment described herein operates by comparing the bit stream from the packet to a preselected bit frame, other alternatives are contemplated by this invention. For example, if Manchester coding is being used, another way to detect the occurrence of the preselected bit pattern is to look for the presence of the shorter pulse in the preamble of the packet. Note that the "10101011" sequence of the start of frame delimiter has the form shown in FIG. 5. The sequence of "101010" generates a corresponding sequence of pulses, all having widths equal to T. However, when two one bits occur next to each other, as they do at the end of the start of frame delimiter, the resulting signal pulse width is only T/2. The shorter pulse indicates that the start of frame delimiter has been received and can be used to mark the arrival of the packet.

It should be understood that the first and second maintenance stations 12a and 12b are also nodes which may perform other functions which involve using the network. In addition, the maintenance stations 12a and 12b need not be placed precisely at the end of a segment. For example, it should be apparent from the above description of one particular embodiment that the specific equations used for determining the physical location of the nodes on the segment only required that the relevant nodes be located on the portion of the segment between the two stations. For the digital time measurement technique illustrated in FIG. 3, it is desirable to use a high frequency clock, e.g. 200 MHz. If a lower frequency clock is used, such as a 20 MHz clock, then one may wish to employ additional circuitry to determine precisely at what point within the 50 ns clock cycle that the packet arrives. Such circuitry might include an integrator which generates a linear ramp voltage upon the occurrence of each clock edge and a 6-bit A/D converter to divide the 50 ns interval into about 1 ns increments. Referring again to FIG. 3, the output of flip-flop 42 could be used to start the integrator and the output of flip-flop 44 could be used to stop it. The resulting output of the A/D converter when properly calibrated would indicate the fraction of the clock cycle which elapsed prior to the arrival of the packet and when combined with the reading from register 52 would provide higher resolution than is available from the 20 MHz clock alone.

Having thus described illustrative embodiments of the invention, it will be apparent that various alterations, modifications and improvements will readily occur to those skilled in the art. Such obvious alterations, modifications and improvements, though not expressly described above, are nonetheless intended to be implied and are within the spirit and scope of the invention. Accordingly, the foregoing discussion is intended to be illustrative only, and not limiting; the invention is limited and defined only by the following claims and equivalents thereto.

What is claimed as new and desired to be secured by Letters Patent of the United States is:

1. A method for determining locations of nodes along a network segment, said segment having a plurality of nodes coupled thereto, said plurality of nodes having at least a first node and a second node, the method comprising:
   a. receiving a first packet and a second packet at a first station located at a first location on said segment, the first packet being sent over said network segment by the first node, and the second packet being sent over said network segment by the second node;
   b. recording a first arrival time that is the time at which the first packet arrives at the first station;
   c. recording a second arrival time that is the time at which the second packet arrives at the first station;
   d. receiving the first packet and the second packet at a second station located at a second location of said segment;
   e. recording a third arrival time that is the time at which the first packet arrives at the second station;
   f. recording a fourth arrival time that is the time at which the second packet arrives at the second station; and
   g. computing a distance along said network segment between the first node and second node based solely upon the first, second, third and fourth arrival times and a factor which is independent of packet arrival and transmission times.

2. The method of claim 1 wherein the step of computing the distance is performed by computing the following equation:

$$[D = A*[(T_{21} - T_{11}) - (T_{22} - T_{12})]]$$

$$D = A*((T_{21} - T_{11}) - (T_{22} - T_{12}))$$

where
   A is said factor and where

D is the distance,
$T_{21}$ is the second arrival time,
$T_{11}$ is the first arrival time,
$T_{22}$ is the fourth arrival time, and
$T_{12}$ is the third arrival time.

3. The method of claim 2 wherein said first and second packets propagate over said network segment at a measurable speed and A is equal to about one half of said measurable speed.

4. An apparatus for determining locations of nodes along a network segment, said segment having a plurality of nodes coupled thereto, said plurality of nodes having at least a first node and a second node, the apparatus comprising:

a. a first station connected to said network segment at a first location, the first station for receiving packets at the first location, the first station including a first means for recording a first arrival time that is the time at which a first packet arrives at the first station and a second arrival time that is the time at which a second packet arrives at the first station, the first packet being sent by the first node over said network segment, and the second packet being sent by the second node over said network segment;
   b. a second station connected to said network segment at a second location, the second station for receiving packets at the second location, the second station including a second means for recording a third arrival time that is the time at which the first packet arrives at the second station and a fourth arrival time that is the time at which the second packet arrives at the second station; and
   c. a computational element in communication with said first and second stations for computing a distance along said network segment between the first node and second node based solely upon the first, second, third and fourth arrival times and a factor which is independent of packet arrival and transmission times.

5. The apparatus of claim 4 wherein the first node and the second node are coupled to the network segment at locations along said network segment which are situated between the first and second locations.

6. The apparatus of claim 4 wherein the computational element computes the distance based upon the following equation:

$$[D = A * [(T_{21} - T_{11}) - (T_{22} - T_{12})]]$$

$$D = A * ((T_{21} - T_{11}) - (T_{22} - T_{12}))$$

where
A is said factor and where
D is the distance,
$T_{21}$ is the second arrival time,
$T_{11}$ is the first arrival time,
$T_{22}$ is the fourth arrival time, and
$T_{12}$ is the third arrival time.

7. The apparatus of claim 6 wherein said first and second packets propagate over said network segment at a measurable speed and A is equal to about one half of said measurable speed.

8. The apparatus of claim 4 wherein the first recording means comprises:
a first detector for detecting the arrivals at the first station of the first and second packets;
a first timing circuit electrically coupled to said first detector for determining the first and second arrival times based upon the detected arrivals at the first station of the first and second packets, respectively; and
a first memory electrically coupled to said first timing circuit for receiving and storing the first and second arrival times.

9. The apparatus of claim 8 wherein the first and second packets each includes a preamble and wherein the first detector detects the arrivals of the first and second packets by detecting their respective preambles.

10. The apparatus of claim 8 wherein the second recording means comprises:
a. a second detector for detecting the arrivals at the second station of the first and second packets;
b. a second timing circuit electrically coupled to said second detector for determining the third and fourth arrival times based upon the detected arrivals at the second station of the first and second packets, respectively; and
c. a second memory electrically coupled to said second timing circuit for receiving and storing the third and fourth arrival times.

11. The apparatus of claim 10 wherein the first and second timing circuits need not be synchronized.

12. The apparatus of claim 10, wherein each of the plurality of nodes has a corresponding address and wherein the first station further comprises first recognizer logic electrically coupled to the first detector and the first memory for determining the addresses of the first and second nodes which respectively sent the first and second packets by extracting information contained in the first and second packets, the address determined by the first recognizer logic being stored in the first memory in association with the corresponding first and second arrival times.

13. The apparatus of claim 12, wherein the second station further comprises second recognizer logic electrically coupled to the second detector and the second memory for determining the addresses of the first and second nodes which respectively sent the first and second packets by extracting information contained in the first and second packets, the addresses determined by the second recognizer logic being stored in the second memory in association with the corresponding third and fourth arrival times.

14. An apparatus for determining locations of nodes along a network segment, said segment having a plurality of nodes coupled thereto, said plurality of nodes having at least a first node and a second node, the apparatus comprising;

a. a first station connected to said network segment at a first location, the first station for receiving packets at the first location, the first station comprising:
      i. a first detector for detecting the arrivals at the first station of a first packet and a second packet, the first packet being sent over said network segment by the first node, and the second packet being sent over said network segment by the second node;
      ii. a first timing circuit electrically coupled to said first detector for determining a first arrival time and a second arrival time based upon the detected arrivals at the first station of the first and second packets, respectively, the first arrival time being the time at which the first packet arrives at the first station and the second arrival time being the time at which the second packet arrives at the first station; and iii. a first memory electrically coupled to said first timing circuit for receiving and storing the first and second arrival times;
b. a second station connected to said network segment at a second location, the second station for receiving packets at the second location, the second station comprising:
   i. a second detector for detecting the arrivals at the second station of the first packet and the second packet;
   ii. a second timing circuit electrically coupled to said second detector for determining a third arrival time and a fourth arrival time based upon the detected arrivals at the second station of the first and second packets, respectively, the third arrival time being the time at which the first packet arrives at the second station and the fourth arrival time being the time at which the second packet arrives at the second station; and
   ii. a second memory electrically coupled to said second timing circuit for receiving and storing the third and fourth arrival times; and
c. a computation element in communication with said first and second station for computing a distance along said network segment between the first node and second node based upon the following equation:

$$[D = A*[(T_{21} - T_{11}) - (T_{22} - T_{12})]]$$

$$D = A*((T_{21} - T_{11}) - (T_{22} - T_{12}))$$

where
  A is a factor which is independent of packet arrival and transmission times and where
  D is the distance,
  $T_{21}$ is the second arrival time,
  $T_{11}$ is the first arrival time,
  $T_{22}$ is the fourth arrival time, and
  $T_{12}$ is the third arrival time.

* * * * *

UNITED STATES PATENT AND TRADEMARK OFFICE
CERTIFICATE OF CORRECTION

PATENT NO.   : 5,247,464

DATED        : September 21, 1993

INVENTOR(S)  : Robert A. Curtis

It is certified that error appears in the above-identified patent and that said Letters Patent is hereby corrected as shown below:

Title page, item [56],

Under References Cited, U.S. Patent Documents, add:

| | | | |
|---|---|---|---|
| 4,813,012 | 3/1989 | Valeri et al. | 364/900 |
| 4,845,735 | 7/1989 | Payne et al. | 379/24 |
| 4,896,315 | 1/1990 | Felker et al. | 370/17 |
| 4,930,093 | 5/1990 | Houser et al. | 364/900 |

Col. 2, line 24, after "times", insert a period --.--;

Col. 2, line 33, after "times", insert a period --.--;

Col. 2, line 49, after "synchronized", insert a period --.--.

Col. 3, line 29, after "segments", insert a period --.--;

Col. 3, line 54, change "T" to --$T_{ns}$--.

Col. 4, line 18, change "b" to --by--.

Col. 6, line 61, change "th" to --the--.

UNITED STATES PATENT AND TRADEMARK OFFICE
CERTIFICATE OF CORRECTION

PATENT NO. : 5,247,464

DATED : September 21, 1993

INVENTOR(S) : Robert A. Curtis

It is certified that error appears in the above-identified patent and that said Letters Patent is hereby corrected as shown below:

Col. 8, line 47, change "of" to --on--;

Col. 8, before line 65, delete the entire equation "[D=A*[T$_{21}$-T$_{11}$)=(T$_{22}$-T$_{12}$)]]".

Col. 9, before line 50, delete the entire equation "[D=A*[(T$_{21}$-T$_{11}$)=(T$_{22}$-T$_{12}$)]]";

Col. 9, line 64, before "a first", insert --a.--;

Col. 9, line 66, before "a first", insert --b.--.

Col. 10, line 3, before "a first", insert --c.--;

Col 10, line 32, change "address" to --addresses--.

Col. 12, line 1, change "ii." to --iii.--;

Col. 12, line 5, change "station" to --stations--;

Col. 12, before line 10, delete the entire equation "[D=A*[(T$_{21}$-T$_{11}$)=(T$_{22}$-T$_{12}$)]]".

Signed and Sealed this

Thirtieth Day of May, 1995

Attest:

BRUCE LEHMAN

*Attesting Officer*       *Commissioner of Patents and Trademarks*